United States Patent

[11] 3,610,640

[72] Inventors Robert S. Bollin;
Eugene S. Superczynski, both of Toledo, Ohio
[21] Appl. No. 809,127
[22] Filed Mar. 21, 1969
[45] Patented Oct. 5, 1971
[73] Assignee Curtis Manufacturing Company
Cleveland, Ohio

[54] CHUCK ASSEMBLY
5 Claims, 10 Drawing Figs.

[52] U.S. Cl. .................................................. 279/1 SG,
81/57.18, 81/57.2, 269/217, 279/106, 279/123
[51] Int. Cl. ................................................. B23b 31/12
[50] Field of Search .......................................... 279/106,
109, 33, 123, 1 SG; 269/217; 81/57.18, 57.2

[56] References Cited
UNITED STATES PATENTS
2,980,434   4/1961   Hoffman ..................... 279/106
2,985,458   5/1961   Everett ........................ 279/106

Primary Examiner—Andrew R. Juhasz
Assistant Examiner—James F. Coan
Attorney—Allen D. Gutchess, Jr.

ABSTRACT: A chuck assembly for gripping pipe is of a simplified design involving fewer parts and has jaws which are more effective in gripping pipe over a wide range of diameters. The chuck assembly is particularly useful for pipe threading machines.

PATENTED OCT 5 1971
3,610,640
SHEET 1 OF 2
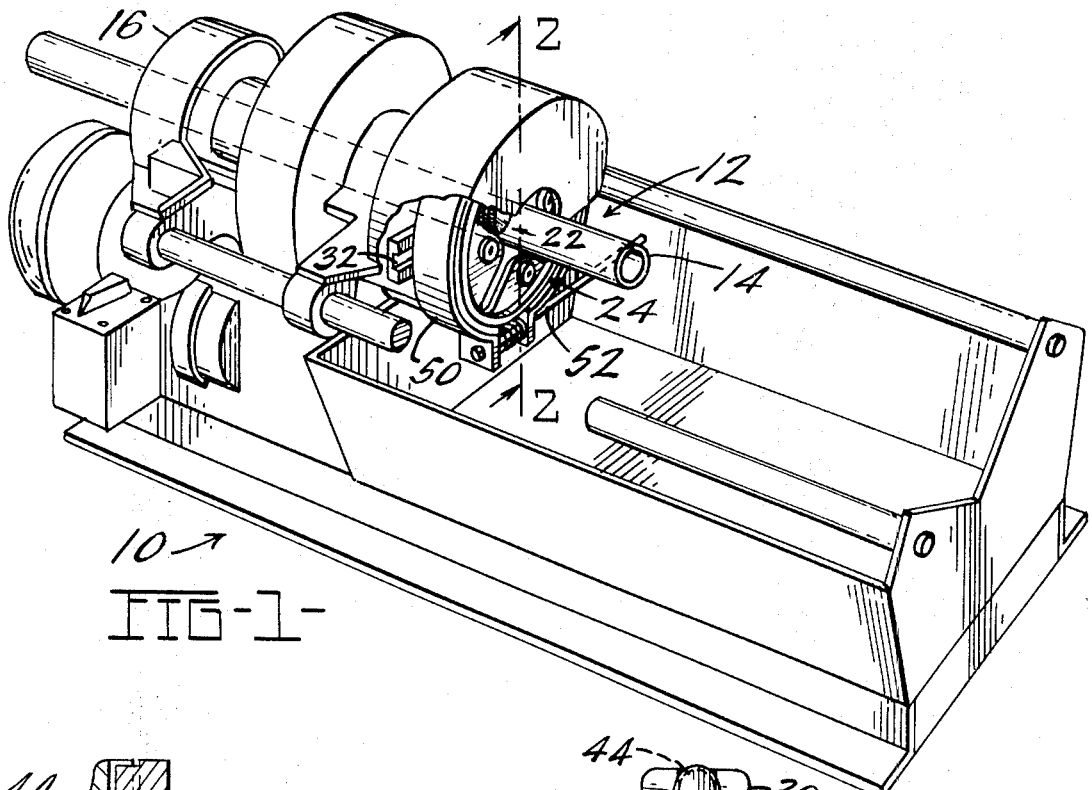
FIG-1-
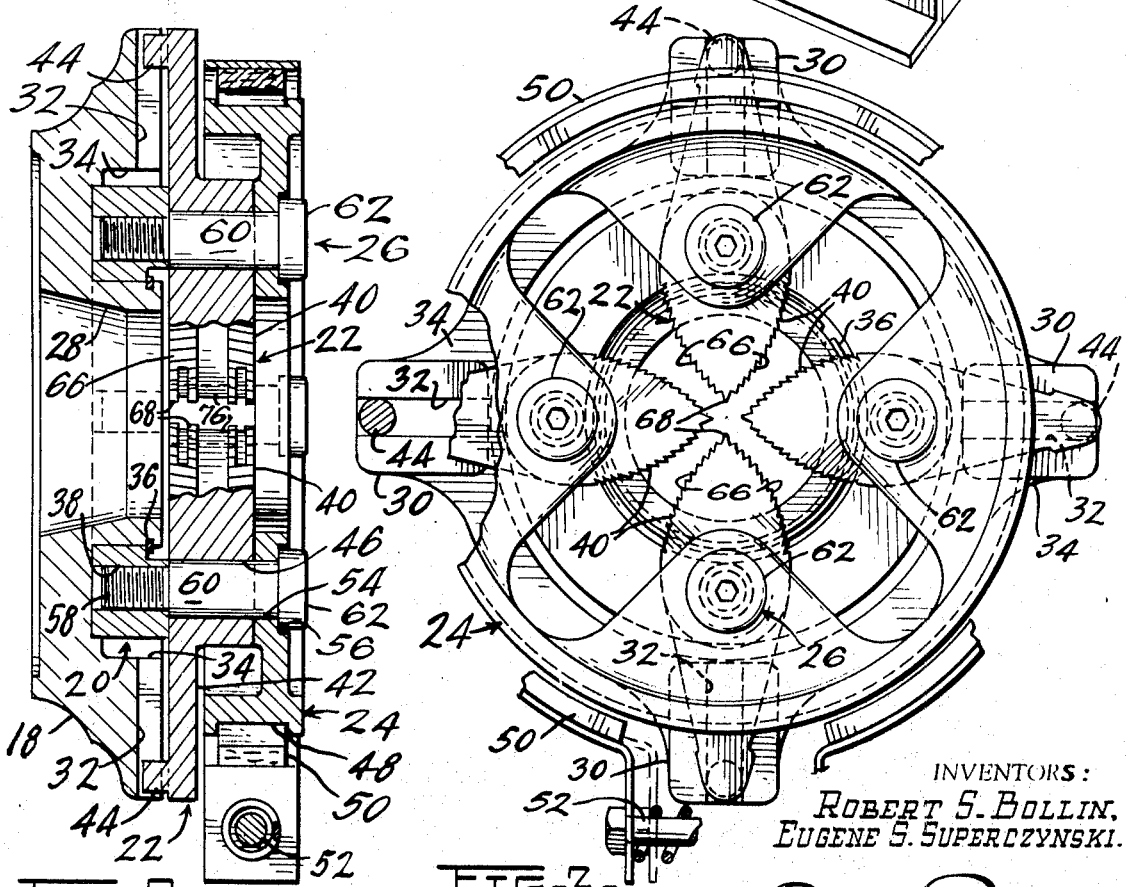
FIG-2-
FIG-3-
INVENTORS:
ROBERT S. BOLLIN,
EUGENE S. SUPERCZYNSKI.
BY Owen + Owen
ATT'YS.

PATENTED OCT 5 1971
3,610,640
SHEET 2 OF 2
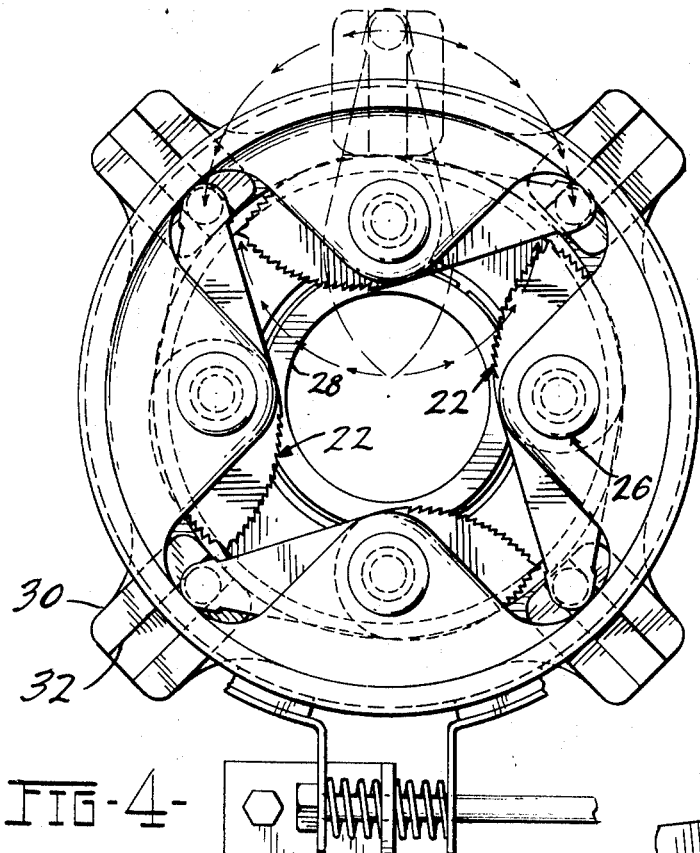
FIG-4-
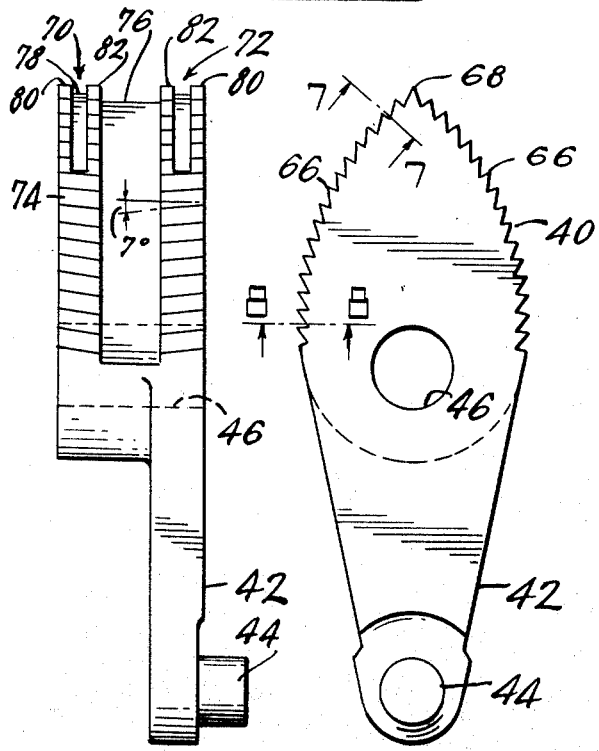
FIG-5-   FIG-6-
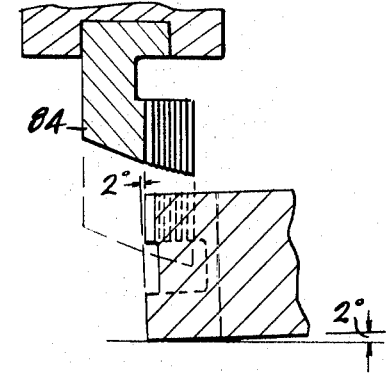
FIG-10-
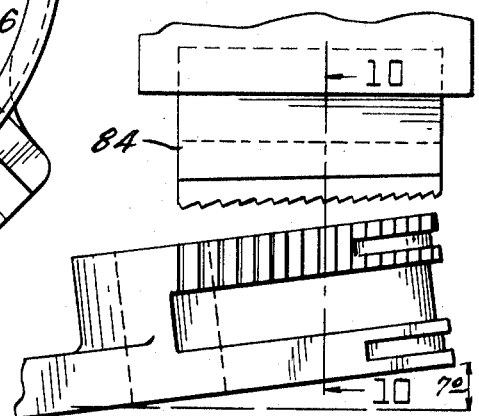
FIG-9-
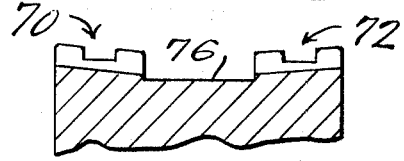
FIG-7-
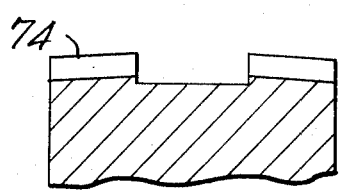
FIG-8-
INVENTORS:
ROBERT S. BOLLIN,
EUGENE S. SUPERCZYNSKI.
BY Owen & Owen
ATT'YS.

CHUCK ASSEMBLY

This invention relates to a device for gripping and rotating a workpiece and more specifically to a chuck assembly for pipe.

Chuck assemblies for automatically gripping and releasing pipe particularly for use with pipe threading machines are known in the art. The present invention provides an improved chuck assembly of the type shown in Everett U.S. Pat. No. 2,985,458. The new chuck is of a simplified design and involves relatively few separate components or parts, enabling the chuck assembly to be produced at a lower cost than heretofore possible and to be more reliable and maintenance free. The new chuck assembly also forms fewer recesses or pockets in which chips can collect and cause potential jamming.

The new chuck assembly has jaws which are more effective than those heretofore known in gripping pipe over a large range of diameters and especially small pipe. A given size chuck assembly, for example, can effectively grip pipe ranging from one-eighth-inch to 2-inch nominal size. The smaller size pipe in particular have heretofore been difficult to automatically and firmly grip.

It is, therefore, a principal object of the invention to provide a chuck assembly having the features and advantages outlined above.

Other objects and advantages of the invention will be apparent from the following detailed description of a preferred embodiment thereof, reference being made to the accompanying drawings, in which:

FIG. 1 is a somewhat schematic view in perspective of a pipe threading machine employing a chuck assembly according to the invention;

FIG. 2 is an enlarged view in vertical cross section taken centrally through the chuck assembly;

FIG. 3 is a front view in elevation, with parts broken away, of the chuck assembly of FIG. 2;

FIG. 4 is a view similar to FIG. 3 of the chuck assembly with jaws in a different position;

FIG. 5 is a side view in elevation of a chuck jaw employed in the chuck assembly;

FIG. 6 is a front view in elevation of the chuck jaw of FIG. 5;

FIG. 7 is a fragmentary view in cross section taken along the line 7—7 of FIG. 6;

FIG. 8 is a fragmentary view in transverse cross section taken along the line 8—8 of FIG. 6;

FIG. 9 is a schematic side view in elevation of a jaw being machined and a cutting tool associated therewith; and FIG. 10 is a view in vertical section of the jaw and the cutting tool of FIG. 9, taken along the line 10—10 thereof.

Referring to FIG. 1, a pipe-threading machine 10 is of a conventional design except for incorporating a chuck assembly 12 embodying the invention. A pipe 14 to be threaded is inserted into the chuck assembly 12 from the rear thereof and through a rear-centering device 16 which can be generally similar in design to the chuck 12. The device 16 does not grip the pipe but primarily centers it, as is known in the art, so that the rear portion thereof is supported coaxially with the forward portion to be threaded. The chuck assembly 12 automatically grips and centers the pipe 14 when the machine is turned on and rotated. When the threading operation is completed, the pipe 14 is released when the machine is momentarily reversed. The jaws then open fully, ready to receive any size of pipe within the design range of the chuck without further adjustment. Pipe threading machines of this type must be capable of handling a wide variety of pipe as small as one-eighth-inch nominal size. The chuck assembly 12 is capable of effectively gripping such pipe and can accommodate pipe diameters as large as 2-inch nominal size.

Referring now to the details of the chuck assembly in FIGS. 2–4, the assembly consists of only five basic parts, including a jaw-driving plate 18, a jaw-mounting ring 20, jaws 22, a brake disc 24, and fasteners 26. The jaw-driving plate 18 is attached to the pipe-threading machine by suitable fasteners and is driven thereby. The driving plate has a central guide passage 28 through which the pipe to be threaded is guided and supported until engaged by the jaws 22. The driving plate also has four ears 30 extending outwardly and in which are formed radial grooves 32 which extend from the outer ends of the ears 30 to a concentric annular groove 34 in which the mounting ring 20 is rotatably carried and held by a retaining ring 36. The ring 20 has four threaded openings 38 which receive the fasteners 26.

The jaws 22, to be discussed in more detail subsequently, each include a generally spearhead-shaped, inwardly extending end 40 and an outwardly extending tongue 42 terminating in a side tang 44 which is received in one of the grooves 32. An intermediate portion of the jaw 22 between the inner end 40 and the tongue 42 has a pivot passage or opening 46 in which the fastener 26 is received.

The brake disc 24 has an outer shallow groove 48 in which is received a brake band 50 which is held in place by a threaded rod 52 having an end attached to the pipe-threading machine 10. The brake disc 24 also has four openings 54 (FIG. 2) with associated annular recesses 56 to receive the fasteners 26.

The fasteners 26 have threaded ends 58 (FIG. 2) which are received in the tapped openings 38 and have enlarged cylindrical shanks 60 which are received in the intermediate openings 46 of the jaws 22 as well as the openings 54 of the brake disc 24. Heads 62 of the fasteners are partly recessed in the annular recesses 56 and abut the inner ends thereof with the inner ends of the shanks 60 abutting the face of the mounting ring 20. The heads have central hexagonal recesses 64 therein to receive Allen-head wrenches. The cylindrical shank portions 60 have a close ft with the jaw openings and the brake disc openings and the dimensions of the fasteners are such as to provide a snug but rotatable relationship between the disc 24, the jaws 22, and the ring 20.

When the brake band 50 provides a drag on the disc 24 and the drive plate 18 is driven in a counterclockwise direction, as viewed in FIGS. 3 and 4, the drive plate also tends to move in the same direction relative to the ring 20. This tends to move the tangs 44 and the tongues 42 in a counterclockwise direction relative to the fastener 60 and move the ends 40 in the same direction until they contact the pipe 14. If there is no pipe in the chuck assembly, the jaws simply swing beyond the radial position of FIG. 3 and to the maximum slanted position at the other extreme with the tangs 44 again at the innermost ends of the grooves 32. The jaws, at one extreme, are ready to grip a pipe for right-hand threads and at the other extreme, ready to grip a pipe for left-hand threads, with no adjustments being required. With a pipe present, the jaw ends 40 engage the surface of the pipe and hold it firmly for either direction of movement, constantly maintaining pressure thereon due to the tendency of relative motion between the mounting ring 20 and the drive plate 18. The pressure of the jaws on the pipe can be regulated by the extent of the drag on the brake disc 24 exerted by the brake band 50.

From the above, it will be seen that the construction of the chuck assembly 12 is relatively simple and involves relatively few parts. The construction also is extremely rugged which, along with the small number of parts involved, achieves a dependable and maintenance-free design. Further, the areas where chips may catch are kept to a minimum, thereby minimizing jamming and cleaning.

The design of the jaws and particularly the inner ends 40 thereof is critical in order to enable the jaws to effectively grip a wide range of pipes and particularly small ones. The jaws must be capable of automatically centering the pipe, gripping it, and maintaining the drip during the threading or other machining operation. The design of the jaws 22 as shown in FIGS. 5–10 has been found effective in accomplishing the purposes even when employed with small-diameter pipe.

Referring to FIGS. 5 and 6, the inner end 40 of the jaw has two generally symmetrical arcuate edge surfaces 66 meeting in a point 68. Each of the two surfaces has two main rows 70 and 72 of teeth 74 all slanting toward the point 68. The rows are separated by a space or groove 76 which has a width preferably equal to or greater than the width of the rows 70 and 72. Also of importance is the fact that the first six teeth in each of the rows 70 and 72 near the point 68 are further divided by grooves 78 into individual teeth 80 and 82. This provides four teeth to engage the surfaces of smaller pipe and contributes to the improved gripping action.

The gripping action of the teeth also is substantially enhanced by forming the teeth at particular angles. Accordingly, when the teeth are formed by a slotter having a cutting tool 84, as shown in FIGS. 9 and 10, which tool has the same contour as either of two diagonally opposite rows of teeth, the jaw is tilted back with the tongue down at an angle of about 7° to the horizontal or to a plane perpendicular to the path of the tool 84, with an angle from about 6° to about 8° being satisfactory. At the same time, and as shown particularly in FIG. 10, the jaw is tilted transversely toward the path of the tool at an angle of about 2° to a plane parallel to the path of the tool 84, with an angle from about 1.5° to about 2.5° being satisfactory. The 7° tilt causes the teeth to be formed so that they engage the surface of the pipe at an angle to the longitudinal extent thereof. This produces a more concentrated force on the surface of the pipe.

With the 2° transverse tilt of the tool, each tooth in each row varies in height from the inside to the outside except for one tooth which is in about the ninth row when a 2° tilt is used, but which row may vary, depending on the angle of tilt. The teeth toward the point of the tool are higher on the outside, as shown in the cross-sectional view of FIG. 7, while the teeth at the rear of the row, away from the point, are higher on the inside, as shown in FIG. 8. This again provides a more concentrated force of the teeth on the pipe with the teeth in the two adjacent rows 70 and 72 concentrating their areas of engagement at the higher portions of the teeth but with the two points of engagement being spaced apart in all instances. At the rear portion of the row, the deeper points of engagement are spaced apart about the width of the groove 76. At the forward portion toward the point or tip of the rows, the deeper points of engagement are spaced apart the width of the groove 76 as well as a substantial portion of the width of each of the two rows 70 and 72 (FIG. 7). Thus, for smaller pipe, the deeper points of engagement of the teeth therewith are spaced apart farther than for larger diameter pipe engaged by the teeth at the rear portion of the rows.

While the exact theory of the effectiveness of the engagement of the teeth with the varying sizes of pipe may not be fully understood, the effectiveness of the teeth and the jaws has been proved in actual operation of the chuck assembly, with the jaws consistently centering and fully engaging pipe, without slipping, for all diameters for which the chuck assembly is intended.

Various modifications of the above described embodiment of the invention will be apparent to those skilled in the art and it is to be understood that such modifications can be made without departing from the scope of the invention, the embodiment shown and described being primarily for purposes of illustration and not limitation.

We claim:

1. A chuck jaw for an automatic pipe chuck, said jaw being of generally spearhead shape in front elevation and being symmetrical about a longitudinal axis, said jaw including two arcuate edge surfaces meeting in a point, said jaw having a rearwardly extending tongue for rotating said jaw, said jaw further having a central pivot opening near the base of said tongue, said jaw having four rows of teeth, a pair on each edge surface with each pair spaced apart a distance not less than the width of one of the rows, each of said teeth being inclined toward the point of said jaw, said teeth also slanting rearwardly from the point toward the center of the space between the rows, said teeth near the point in several rows further being grooved to form separate work-engaging tip teeth, and said teeth of each row being higher on the inside at the rear thereof and higher on the outside at the point thereof.

2. A chuck assembly comprising a plurality of chuck jaws, each having an inner end, an intermediate hole, and a single tongue extending outwardly therefrom and terminating in a single transverse tang extending from one side of said tongue, the inner end of each of said jaws having an arcuate surface terminating at a point, said arcuate surface having two rows of teeth spaced apart with a groove therebetween, at least a majority of the teeth in each of said rows varying uniformly in height from one end to the other and being symmetrical about a plane taken centrally through the groove, a jaw driving plate having a central passage and a hub therearound and further having a plurality of substantially radially extending grooves, one for each of said jaws, a jaw mounting ring rotatably carried on said hub around said central passage, said mounting ring having a plurality of openings, one for each of said jaws, uniformly spaced therearound, a brake disc having a central opening therein and having an outer braking surface, said brake disc having a plurality of openings, one for each of said jaws, equally spaced apart and at a common distance from the center of said central opening, and fasteners extending through said brake disc openings, through said intermediate holes of said jaws, and into said mounting ring openings to mount said brake disc and said jaws on said mounting ring with said jaw tangs received in said radial grooves of said driving plate.

3. A chuck assembly according to claim 2 characterized by the teeth of each of said jaws near the point of each row being higher on the outside and the teeth at the rear of each row being higher on the inside, and each of said fasteners including a threaded end threadedly engaged in one of said mounting ring openings, a shoulder adjacent said threaded end and abutting said mounting ring, and an enlarged head abutting a portion of said brake disc.

4. A chuck jaw for a pipe chuck assembly, said jaw having an arcuate surface at one end thereof terminating at a point, said arcuate surface of said jaw having two rows of teeth spaced apart with a groove therebetween, said jaw further having a rearwardly extending tongue, and a tang extending outwardly from one side of said tongue for rotating said jaw, at least a majority of the teeth in each of said rows varying uniformly in height from one end to the other end and being symmetrical about a plane taken centrally through the groove, with the teeth near the point of each row being higher on the outside and the teeth at the rear of each row being higher on the inside.

5. A chuck jaw according to claim 4 wherein several of the teeth near the point of the jaw are notched to further subdivide the teeth into separate work-engaging portions.